United States Patent [19]
Woods

[11] Patent Number: 5,279,343
[45] Date of Patent: Jan. 18, 1994

[54] ROUTER TEMPLATE

[75] Inventor: Richard S. Woods, Menomonee Falls, Wis.

[73] Assignee: Empire Level Mfg. Corporation, Milwaukee, Wis.

[21] Appl. No.: 760,731

[22] Filed: Sep. 16, 1991

[51] Int. Cl.$^5$ .................. B27F 5/12; B27G 17/08
[52] U.S. Cl. .................. 144/144.5 R; 33/197; 33/562; 144/27; 144/144 R
[58] Field of Search .................. 33/197, 562; 409/125, 409/130; 144/144 R, 144 S, 27

[56] References Cited

U.S. PATENT DOCUMENTS

| | | | |
|---|---|---|---|
| 2,927,378 | 3/1960 | Godfrey et al. | 144/27 |
| 3,407,853 | 10/1968 | Bailey | 144/27 |
| 3,559,704 | 2/1971 | Thompson | 144/27 |
| 3,738,013 | 6/1973 | Gregory | 144/27 |
| 4,565,228 | 1/1986 | Ponce | 144/27 |
| 5,042,543 | 8/1991 | Carey | 144/27 |

Primary Examiner—W. Donald Bray
Attorney, Agent, or Firm—Jones, Day, Reavis & Pogue

[57] ABSTRACT

A router template for use in conjunction with a milling tool to create mortises of predetermined size and spacing in an underlying work surface, such as a door edge and door jamb, for butt hinges, a strike plate, and a latch plate. A plurality of router template bodies having template inserts will accommodate strike plates, latch plates, a variety of hinge sizes, and the typical thickness of these hardware work pieces. The router template bodies may be used in conjunction with a guide bar to provide typical positioning for the hinges along the door edge and jamb. This tool may be used with minimal adjustment.

28 Claims, 5 Drawing Sheets

ROUTER TEMPLATE

BACKGROUND OF THE INVENTION

The present invention relates generally to the milling of a mortise or series of mortises, and more particularly, to a hand tool for use in such a milling process for facilitating the proper size and placement of such mortises.

Within the field of carpentry, a need frequently arises to mill, often with the assistance of a chisel or mechanical router, a mortise of a particular size and position into the surface of wood or metal. Mortises are particularly needed in doors and associated door jambs for accommodating the leaves of a butt hinge. Such a mortise permits the hinge leaf to be recessed within the surface of the door or jamb, thereby ensuring proper closure of the door.

The mortise size will generally be determined by the dimensions of the hinge leaf. A 4-inch hinge, for example, is wider and longer generally than a 3½-inch hinge. Therefore, the dimensions could be marked upon the work surface of the door or jamb, the thickness of the hinge leaf determined, and the resulting mortise obtained by removing the wood material therein by means of a chisel, jig, mechanical router, etc. However, such a "freehand" method of milling a mortise would require a great deal of skill and precision in order to obtain a cavity which will fit the hinge leaf without being too large, and which will allow the exposed surface of the hinge leaf to lie flush with the wood surface of the surrounding door or jamb instead of being overly or underly recessed. Moreover, the respective mortises of the door and jamb would need to be positioned exactly alike so that the door and jamb could be properly joined by means of the hinges. Improper milling or placement of a mortise, therefore, would requirement replacement of the door or jamb.

Hence, carpenters or contractors have resorted to the use of a template positioned against the work surface of the door or jamb in order to guide and facilitate the milling of a butt hinge mortise. Moreover, three or more such templates are generally part of a single hand tool so that the spacing between milled mortises may be predetermined and duplicated on both the door and jamb. One such prior art template device is manufactured and sold by Templaco. In consists simply of a long board in which three holes are located. The template is placed against the edge of a door or jamb, and three mortises are routed within the boundaries of the template holes. While simple in design, though, this template suffers from a number of disadvantages. First, there is no versatility between hinge sizes, thereby requiring use of completely separate templates. Second, it is not possible to use the template to mill mortises for either the strike plate positioned along the door jamb, or the latch plate positioned along the edge of the door (used for guiding the latch bolt, which is operated by the doorknob). Third, the template cannot be used for custom jobs in which the butt hinges must be positioned other than where the template holes require. This need usually arises where four hinges are used, or a replacement door is being installed in an existing door frame having unconventional hinge placements. Therefore, the Templaco device suffers from a severe lack of versatility, requiring ownership of multiple templates to accommodate different sizes of hinges, different spacing between hinges, and latch plates, strike plates, etc.

A more versatile template device is manufactured by Bosch, as Model Numbers 83037 or 83002. It consists of three metal template bodies arranged along adjustable extension rails. Each template body, in turn, incorporates metal hinge size plates, usually tightened with thumb screws. They slide toward and away from each other, and are set to match the length of the hinge in question. Adjustable stop pins rest against the edge of the jamb or the face of the door to ensure that the template is properly positioned to produce a mortise of correct width. Therefore, once the Bosch template is assembled for a particular job, adjustments need to be made for hinge length, door length, door thickness, and hinge spacing for each hinge, plus an adjustment for the clearance between the top of the door and the top door jamb. This requires a minimum of thirteen adjustments to the instrument, using difficult to locate knobs and scales, before three mortises may be milled on a door or jamb. Similar devices are manufactured or sold by Skil (Model No. 71022), Black & Decker (Model No. 58129), Porter-Cable (Model No. 59380), and Milwaukee (Model No. 49-54-0100).

Thus, this device is versatile to the point of being far more complicated to operate than is normally required for residential construction, which typically uses 4-inch or 3½-inch hinges and standard 6'8" doors. Moreover, these devices are expensive, charging most occasional carpenters and home rehabbers for a degree of versatility that will never be used. Furthermore, these devices, like the Templaco template, do not accommodate milling of strike plate or latch plate mortises.

The template of the present invention overcomes these problems associated with the prior art by providing a versatile template for use with a standard 6'8" door, which can accommodate 4-inch and 3½-inch butt hinges, latch plates, and strike plates; may be used for right or left hand doors; will automatically position the hinges and calibrate the router adjustment needed for variances in thicknesses between 3½-inch butt hinges, strike plates, and latch plates; does not require assembly or adjustments; is cheaper than most templates commercially available; and is easy to use.

SUMMARY OF THE INVENTION

Accordingly, it is an object of the present invention to provide a template for use in milling mortises in the surface of wood or metal.

Another object of the present invention is to provide such a template for use in milling mortises for butt hinges, strike plates, and latch plates in doors and jambs.

Yet another object of the present invention is to provide such a template, which will accommodate a variety of different hinge sizes.

Still another object of the present invention is to provide such a template which is easy to use, requiring minimal adjustments.

Yet another object of the present invention is to provide such a template which will accommodate either standard spacing between butt hinges or custom spacing therebetween.

Other objects of the invention, in addition to those set forth above, will become apparent to those skilled in the art from the following disclosure and drawings.

Briefly, the invention is directed to providing a router template for milling mortises in an underlying work surface, such as a door edge and door jamb, for butt hinges, a strike plate, and a latch plate with a minimum amount of adjustment thereof. The tool comprises a guide bar placed against the work surface, and having a plurality of removable router template bodies positioned therein for assisting the creation through a milling tool of a like number of hinge mortises of a predetermined size, having a predetermined spacing therebetween. Insert templates may be combined with one of the router template bodies to create mortises for smaller hinge sizes, a strike plate, and a latch plate. The router template bodies may be used independently of the guide bar.

DETAILED DESCRIPTION OF THE PREFERRED EMBODIMENT

Figure 1:
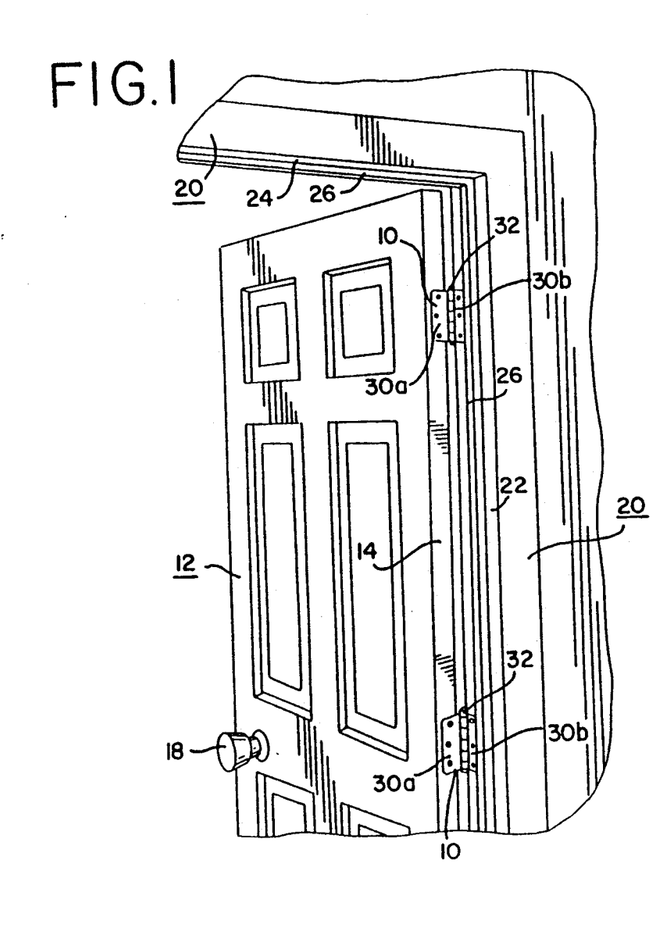
FIG. 1 shows a partial, perspective view of a door connected to a door frame.

As illustrated in FIG. 1, one application of the present invention is the butt hinges 10 used to connect a door 12 to a door frame 20. More specifically, door 12 has door edge 14 and latch bolt 16 projecting from the opposite edge (not shown), operated by means of door knob 18. The door frame 20, whether part of an interior or exterior wall, is defined in part by side jamb 22 and head jamb 24. Positioned along the center of the head and side jambs may be abutment 26 against which the closed door rests.

Figure 2:
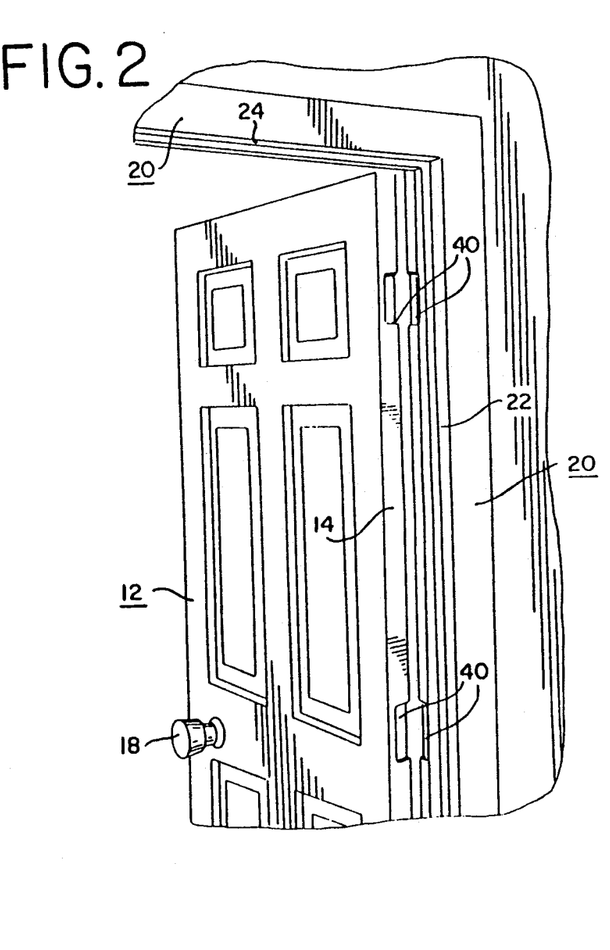
FIG. 2 shows the door and door frame of FIG. 1, except that the hinges have been removed, and the mortises are exposed.

Butt hinge 10 consists of two leaf hinges 30a and 30b connected by means of hinge bolt 32. However, for proper closure of door 12 within door frame 20, it is important that leaf hinges 30a, 30b be recessed within side jamb 22 and door edge 14, respectively, so that the top surface of each leaf hinge is flush with the surface of the side jamb or door. Thus, it is necessary that mortises 40 be milled within the side jamb and door edge for receiving these hinge leaves, as shown in FIG. 2.

Figures 3, 4, 5:
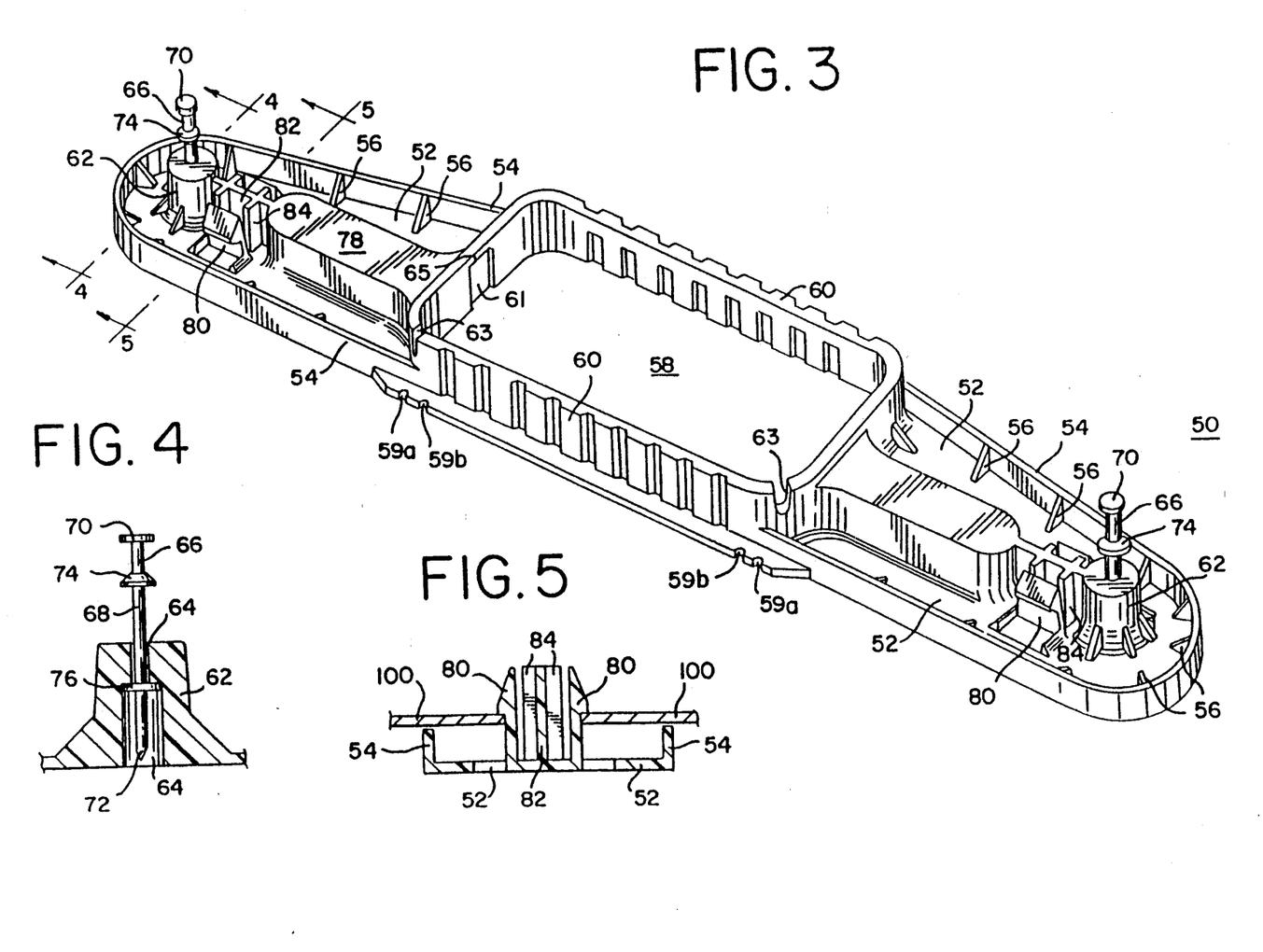
FIG. 3 shows a perspective view of the template body of the present invention.
FIG. 4 shows a partial section view taken along line 4—4 of FIG. 3.
FIG. 5 shows a partial section view taken along line 5—5 of FIG. 3.

FIG. 3 shows the template handtool 50 of the present invention for facilitating the milling of mortises 40. It is molded from plastic, and comprises base 52 bounded along its upper surface by perimeter lip 54, which is reinforced thereby by means of ribs 56. Cut into the center portion of base 52 is template opening 58 defined by template wall 60.

Positioned at both ends of template base 52 is nail boss 62 having bore 64. Positioned in each bore is a captive nail 66. Shown in greater detail in FIG. 4, such a captive nail comprises a shaft 68 with a head 70 at one end and a point 72 at the other. Located near the head and integral with the shaft is a flange 74. Retention cone 76 cooperates with shaft 68 so that when captive nail 66 is installed permanently in template body 50, the top wall of nail boss 62 is retained between flange 74 and cone flange 76. When cone flange 76 abuts top nail boss wall 62, point 72 of shaft 68 does not extend below the lower surface of template base 52. On the other hand, when shaft 68 is pushed down so that flange 74 abuts nail boss 62, as by a hammer blow, point 72 will depend beneath the base and penetrate the underlying surface.

Radiating from template wall 60 is at least one hammer boss 78, providing a suitable surface for the head of a claw hammer, used for raising captive nail 66. Also positioned at each end of the template base 52 are a pair of upwardly projecting snap locks 80, shown in greater detail in FIG. 5. These are vertically oriented, slightly flexible protrusions, having laterally flanged lips, which are used to engage the template body 50 with a guide bar 100 as described below, and may be biased together in order to disengage the template body from the guide bar. The nail boss 62 and hammer boss 78 are preferably joined by an axial rib 82 for strength, and feature laterally protruding ribs 84 used to deflect an errant hammer blow from damaging snap locks 80.

Figure 6:
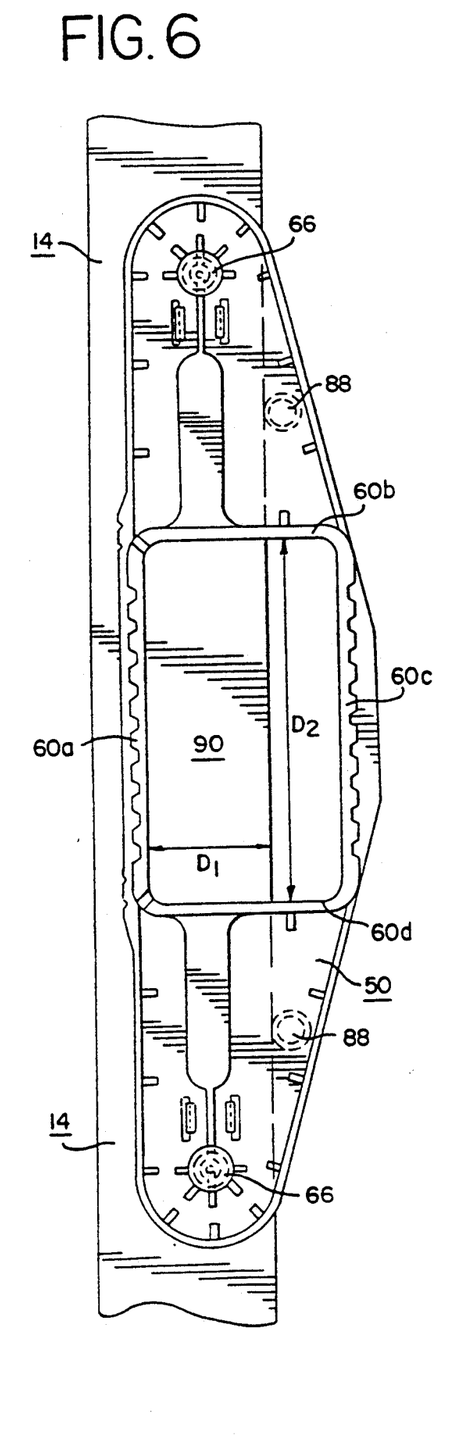
FIG. 6 shows a plan view of the template body of FIG. 3 positioned along a door edge.
Figure 7:
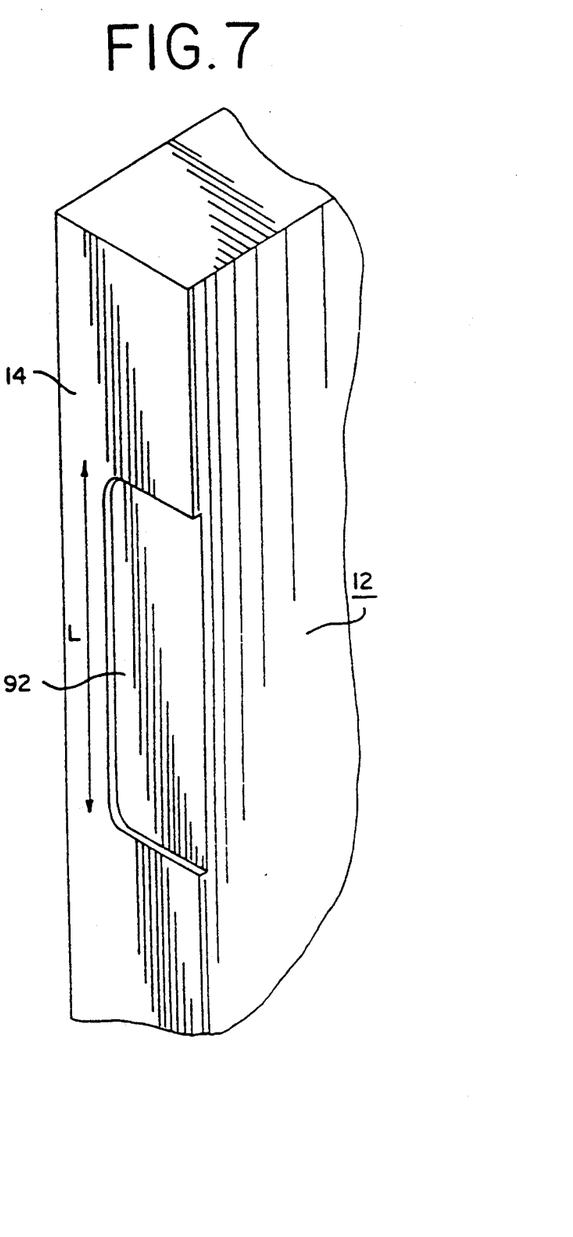
FIG. 7 shows a partial view of a door having a mortise formed using the tool of FIG. 6.

FIG. 6 illustrates door edge 14 with template body 50 attached by means of captive nails 66. Template walls 60 will define a surface portion 90, which preferably may be milled at a predetermined depth by means of an electrical router in order to remove a portion of the material of the door to yield mortise 92 shown in FIG. 7. The depth of mortise 92 should approximately equal the thickness of hinge leaf 30.

The bottom surface of the base portion 52 of template body 50 is smooth so that the template body may be securely positioned against the door edge or jamb. A plurality of bosses 88 depend therefrom, and are integral with the base bottom surface. These bosses are positioned so that they may abut the relevant edge of the door edge 14 or side jamb 22, and position template opening 58 properly therewith. The lateral distance $D_1$ along the bottom of template base 50 between a boss 88 and the opposing longitudinal wall $60a$ determines the width W of the resulting mortise 92. At the same time, the distance $D_2$ between opposed lateral walls $60b$ and $60d$ of template body 50 determines the length L of the resulting mortise. The mortise will not extend through the entire width of the door 12 so the hinge leaf may be retained more securely therein.

Figure 8:
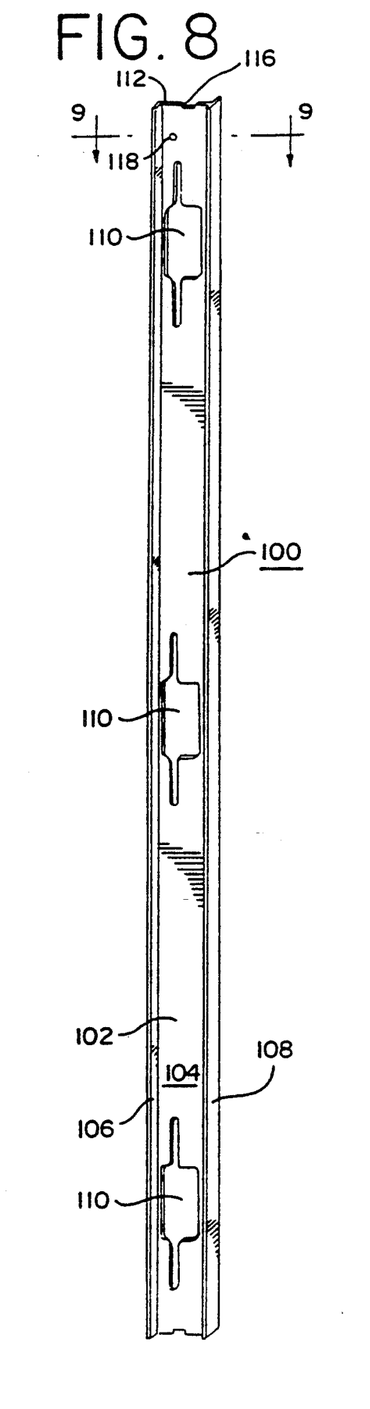
FIG. 8 shows a partial perspective view of a guide bar associated with the template body of FIG. 3.
Figure 9:
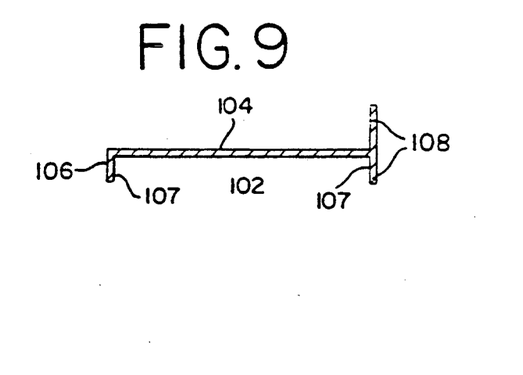
FIG. 9 shows a section view taken along line 9—9 of FIG. 8.

Template body 50 may be used in conjunction with guide bar 100. As shown in FIG. 8, guide bar 100 is made from a suitably strong material, such as aluminum, and comprises a channel 102 formed by base 104 and side walls 106 and 108 extending above the base. Side wall 108 also extends below base 104, thereby forming a t-junction therewith, which not only serves to strengthen the guide bar, but also to provide a handhold. Formed in base 104 of the guide bar are a plurality of cut-out holes 110, which are sized and shaped to accommodate the portion of template body 50 extending above template base 52. Thus, template wall 60, nail bosses 62, hammer bosses 78, and ribs 84 extending laterally from axial ribs 82 generally touch the perimeter of cut-out holes 100, and snap locks 80 engage guide bar base 104 around the cut-out holes to secure template body 50 to guide bar 100 (see FIG. 5). It will be appreciated by this design that the bottom side of guide bar base 104 provides a flat and smooth surface with the exception of edge bosses 88 of template body 50, which depend beneath the guide bar surface. The configuration of guide bar 100 is shown in greater detail in FIG. 9.

While the guide bar 100 in FIG. 8 has been illustrated with cut-out holes 110 for three associated template bodies, it would be possible to provide holes accommodating any number of template bodies greater or equal than two. Three or four holes and template bodies are generally preferred, however, since the tool can accommodate a door using two butt hinges simply by using the top and bottom template bodies. The guide bar provides a simple way to ensure uniform and reproducible spacing between the template bodies. Moreover, the cut-out holes 110 for the template bodies 50 are positioned along guide bar 100 in such a way that the resulting butt hinge mortises 92 are generally in a proper position for an average sized door, such as a 6'8" door and jamb. Of course, the template bodies 50 may be used separately from the guide bar 100 if a different number of butt hinges or different spacing therebetween is desired.

The template body and guide bar assembly is easy to use. First it is placed against the door frame 20 so that the bottom side of guide bar base 104 rests along side jamb 24, and edge bosses 88 of each template body 50 abut the side jamb. The top edge 112 of the guide bar should abut head jamb 24. Once the tool is so positioned, captive nails 66 in each template body 50 are hammered into side jamb 22 to hold the tool assembly in place.

Next, two hinges are positioned on opposite sides of a template wall 60, an electric router is placed on top of the hinges, the router bit is lowered until it touches the surface of side jamb 22, and the depth setting of the bit is locked. At this point, the router will produce a mortise having a depth approximately equal to the thickness of the butt hinge. Note that this adjustment to the router bit could more easily be performed with respect to the door edge 14 before the tool assembly is secured to side jamb 22.

Once the bit depth of the router is set, the top mortise may be milled by positioning the router in opening 58 of the top template body 50, turning it on, and slowly moving it toward the edge of the jamb. Cutting the jamb edge first avoids splintering a wood jamb. This process is repeated for each of the template holes, and finally the tool assembly is removed from side jamb by pulling out the captive nails 66.

This process may be repeated for door edge 14, except that clearance notch 116 at the top of guide bar 100 should be aligned with the top edge of door 12. This notch will allow a predetermined amount of clearance (e.g., ⅛-inch) between the head jamb 24 and the top of the door once the door is secured to door frame 20, because the corresponding hinge leaves will be positioned slightly higher along the door edge. Finally, hinge leaves 30 are secured to the side jamb and door edge mortises by means of screws, and the respective hinge leaves 30a, 30b are connected via hinge bolts 32 to hold the door 12 in place.

Guide bar 100 bears hole 118 in its base 104. This hole is used to secure retainer cone 76 in place while the shaft 68 of a new captive nail 66 is inserted through bore 64 of nail boss 62 of template body 50, positioned over the bore of the retainer cone, and pounded therethrough. In this manner, a new captive nail may be easily secured to a template body.

Figure 10:
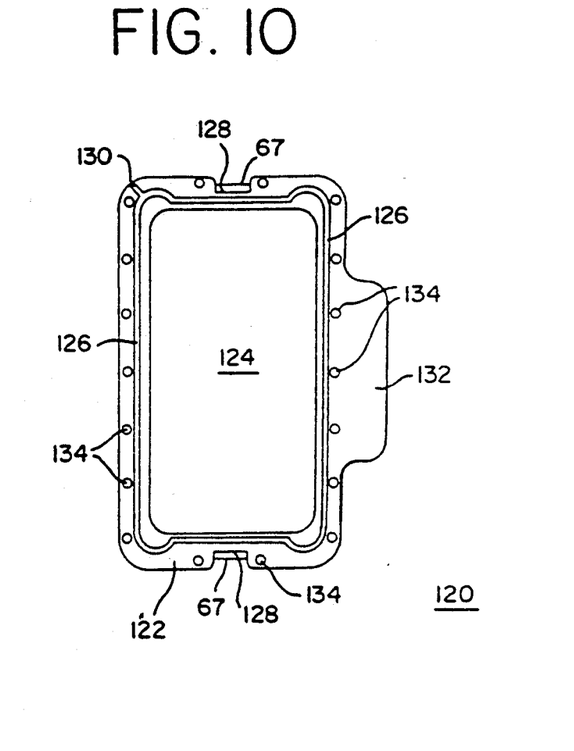
FIG. 10 shows a bottom plan view of a hinge insert template associated with the template body of FIG. 3.

While template bodies 50 will facilitate the milling of a mortise for a commonly used hinge size (e.g., 4-inch), the tool assembly would be more versatile if other hinge sizes could be accommodated. Thus, hinge insert template 120 cooperates with template body 50 to allow smaller mortises to be produced. FIG. 10 shows the bottom side of such a template. It comprises a base 122 having template opening 124 cut therein. Depending from the base and generally following the perimeter of opening 124 is retainer wall 126, which is sized to fit template walls 60a,b,c,d of template body 50. At opposite ends of the hinge insert base 122 are lock tabs 128, which depend therefrom, are slightly flexible, and have lateral flanges along their distal ends. Radiating from one corner of retainer wall 126 is key tab 130. Extending laterally from the base is lift tab 132. Finally depending along the perimeter of the base are a plurality of support bosses 134.

Hinge insert template 120 may be dimensioned for a smaller size hinge, such as a 3½-inch hinge. In order to insert it into template body 50, it is placed over template opening 58 so that key tab 130 of the insert matches keyway 63 of template wall 60. Then the hinge insert template is pushed down to produce a snap or interference fit with the template body by means of the locking tabs 128 of the insert engaging the opposing channels 61 in the template walls 60 of the template body, and the lipped edge 65 of the walls. In order to separate hinge insert template 120 from template body 50, the insert is simply pried from the template body by means of lift tab 132. Thumb holes 67 in insert template base 122 allows biasing of the locking tabs 128 in order to facilitate removal of the insert template from the template body. When assembled, the hinge insert template base 122 is spaced from the top of template wall 60 of template body 50 by the length of support bosses 134 on the insert. The template body 50 could be supplied with a number of such interchangeable hinge insert templates for increasingly smaller hinge sizes.

Figure 12:
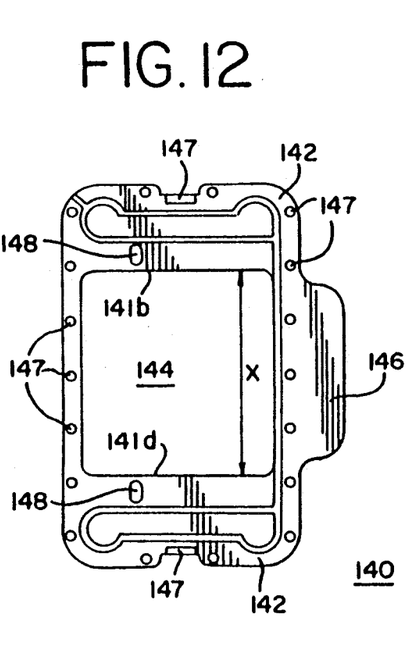
FIG. 12 shows a bottom plan view of a strike plate template associated with the template body of FIG. 3.

The center template body 50 is also outfitted with a strike plate template 140 of generally the same design as hinge insert template 120. The bottom side of the strike plate template 140 is depicted in FIG. 12, and has a base portion 142, an opening 144, and lift tab 146. Also located on opposite sides of the base 142 are holes 148, whose purpose will be described presently. Retainer walls, lock tabs, a key tab, and support bosses 147 on the bottom side of the template are similar in design to those already described for the hinge insert template 120.

Figure 11:
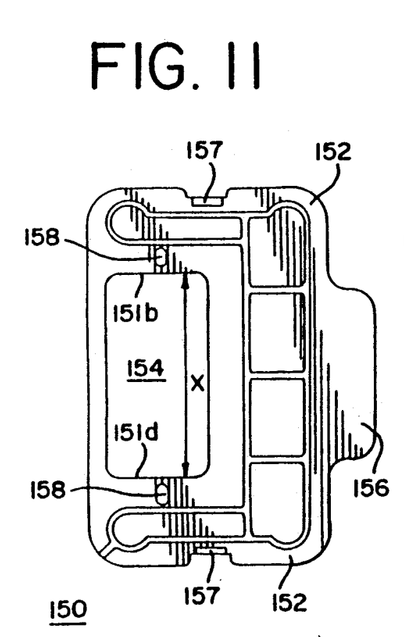
FIG. 11 shows a bottom plan view of a latch plate template associated with the template body of FIG. 3.

A similar latch plate template 150 is illustrated in FIG. 11. The opening 154 is narrower than the opening 144 of strike plate template 140, because a strike plate is generally wider than a latch plate.

Figure 13:
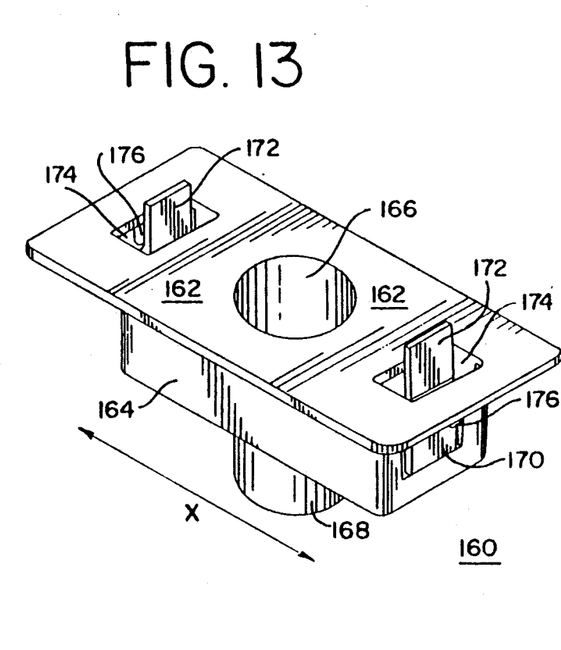
FIG. 13 shows a perspective view of an alignment guide associated with the templates of FIGS. 11 and 12.

Used in conjunction with both the strike plate template 140 and the latch plate template 150 is alignment guide 160, shown in FIG. 13. It comprises a base 162 molded integrally with a box support 164, having length X, which matches the length of the openings 144 and 154, respectively, of the strike and latch plate templates. A bore 166 passes through base 162 and box support 164, emerging in ring wall 168 having the same internal bore diameter, and an outside diameter of suitable size, such as 1 inch. Extending from opposite sides of box support 164 are flared tabs 170, which may be pinched towards each other by means of levers 172, which pass through holes 174 in base 162. Bosses 176 depend from both ends of the base 162.

In order to mill a latch plate mortise in the edge 14 of door 12, a 1-inch diameter hole is drilled therethrough in the appropriate position to accommodate the latch bolt 16. Next, alignment guide 160 is secured to latch plate template 150 so that bosses 176 mate with holes 158, and flared tabs 170 engage the lateral perimeter edges 154b,d of latch plate template base 152 surrounding opening 154. Latch plate template 150, in turn, is secured to template body 50 (which has already been removed from guide bar 100) so that its key tab mates with the keyway 63 in template perimeter wall 60, and its lock tabs 157 engage channels 61 in template walls 60 and the top lip 65 of the walls.

The assembled tool may then be placed against the door edge 14 so that ring wall 168 is inserted inside the 1-inch hole drilled in the door edge. At this point, the captive nails 66 are pounded into the door edge 14 to secure the template body 50 in place, and the alignment guide 160 is removed by means of flared tab levers 172. A router may be used as described above to mill a latch plate mortise in the door edge 14.

After a 1-inch hole is drilled at an appropriate location in side jamb 22, this process is repeated with the template body 50, strike plate template 140, and alignment guide 160 to produce a strike plate mortise in the side jamb.

While the hinge plate template 120, strike plate template 140, and latch plate template 150 may have similar support bosses (e.g., bosses 134 on the hinge plate template), they may be molded with different lengths in order to accommodate different thicknesses commonly associated with butt hinges, strike plates, and latch plates. Thus, if the strike plate, butt hinge, and latch plate commonly have increasingly greater thicknesses, the strike plate template 140, hinge insert template 120, and latch plate template 150 may be provided with increasingly smaller boss lengths so that the router bit can be preadjusted to one length and used to mill strike plate, hinge, and latch plate mortises of appropriate depths.

The channel 102 of guide bar 100 (see FIG. 9) is suitably dimensioned so that it may retain by means of longitudinal niche 107 running the length of side walls 106 and 108 the interchangeable hinge, strike plate, and latch plate templates and the alignment guide when they are not in use.

The template bodies 50 may be removed from guide bar 100, and individually nailed to a door edge 14 or side jamb 22 to accommodate custom hinge requirements. Hence, if mortises for four hinges are needed or a new door must be secured to a door frame 20 already having butt hinges 10, companion mortises may quickly and easily be milled in the door edge 14 by placing it against the side jamb 22, using a hand level to mark on the door edge the top and bottom positions of each jamb hinge, and using the cut-line indentations 59 (see FIG. 3) positioned along the template body base 52 to align each template body 50 on the door edge 14. Cut-line indentations 59a, 59b, etc. are molded in the base for each of the hinge sizes accommodated by the template body and the interchangeable hinge insert templates.

While particular embodiments of the invention have been shown and described, it should be understood that the invention is not limited thereto, since many modifications may be made. For example, the router template could be modified for securement to a metal door or jamb. Moreover, it could be used for creating mortises for purposes other than door edge and jamb hinge applications. The invention is therefore contemplated to cover by the present application any and all such modifications which fall within the true spirit and scope of the basic underlying principles disclosed and claimed herein.

What is claimed is:

1. A router template for facilitating the milling of a mortise within the planar surface of an underlying work piece, said router template, comprising a router template body including:
   a. a base having a generally flat bottom surface for positioning against the planar work surface;
   b. an opening within said base;
   c. a fixed wall surrounding the perimeter of said opening and extending from a top surface of said base, comprising opposing lateral walls perpendicular to the longitudinal axis of the opening, and opposing walls parallel to the longitudinal axis thereof, whereby the walls collectively define a work space for an associated router or other milling tool;
   d. apertures positioned within said base near each end thereof for an associated fastening means used to secure said router template body to the underlying planar work surface; and
   e. a plurality of bosses extending from the bottom surface of said base in a fixed relationship, and positioned within a straight line so that they abut an edge of the underlying work piece when said router template body is positioned against the work surface, wherein a mortise lying within said work space may be milled having a length generally equivalent to the distance between said opposing lateral walls, and a width generally equivalent to the lateral distance between one of the said bosses and the opposing longitudinal wall.

2. A router template as recited in claim 1, wherein said fastening means comprises a nail.

3. A router template as recited in claim 1, wherein said apertures comprise part of a bore within a like number of nail bosses extending in an upwardly direction from said base, a reusable captive nail being secured within each of said bores.

4. A router template as recited in claim 1, wherein the surface area of said work space is greater than the surface area of the resulting mortise so that an edge of the underlying work piece is exposed to the router or other milling tool in order to facilitate creation of the mortise.

5. A router template as recited in claim 1, wherein the underlying work piece comprises a door edge or a door jamb of a door frame.

6. A router template as recited in claim 1, wherein the mortise comprises a mortise for a butt hinge.

7. A router template as recited in claim 1, wherein said work space is dimensioned to accommodate a guide bushing on the router tool.

8. A router template as recited in claim 1, wherein a perimeter edge of said router template body comprises a plurality of indentations for aligning said router template body along the underlying work surface to accommodate a predetermined mortise placement.

9. A router template as recited in claim 5, further comprising a guide bar for positioning multiple router template bodies along the underlying work surface with a predetermined spacing therebetween, said guide bar having a generally flat bottom surface for positioning against the planar work surface, and a plurality of apertures of matable size and dimension in order to accommodate a like number of router template bodies, each router template body having means for securing it to the associated guide bar.

10. A router template as recited in claim 9, wherein said securing means comprises one or more protruded tabs extending from said base, and having a flanged lip at the distal end thereof for engagement in an interference fit with the perimeter edge of one of the apertures of said guide bar, said protruded tab being pivotable to a slight degree with respect to said base.

11. A router template as recited in claim 9, wherein said guide bar further comprises a niche at one end thereof defining a first top edge and a second top edge of the guide bar whereby the first edge is aligned with the top of the door jamb, and the second edge is aligned with the top of the door edge so that the resulting mortise placements will permit a predetermined clearance space between the door and door frame when the door is connected to the door jamb by means of a hinge.

12. A router template as recited in claim 9, wherein said guide bar further comprises an aperture for assisting securement of a captive nail to said router template body.

13. A router template as recited in claim 1, further comprising a template insert for placement over the router template body for defining a smaller mortise surface area, said insert comprising:
   a. a base having a generally flat bottom surface for positioning against the top surface of said walls of said router template body;
   b. a retaining wall extending from the bottom surface of said base, and generally following the perimeter of the opening of said associated router template body;
   c. an opening within said base; and
   d. means for securing said insert template to said router template body.

14. A router template as recited in claim 13, wherein said securing means comprises a plurality of protruded tabs extending from the bottom surface of said insert base, and having a flanged lip at the distal end thereof for engagement in an interference fit with said wall of said router template body, said protruded tabs being pivotable to a slight degree with respect to said insert base.

15. A router template as recited in claim 13, further comprising a key wall extending from the bottom surface of said insert base for mating with a corresponding keyway formed within said wall of said router template body.

16. A router template as recited in claim 13, further comprising a pull tab extending laterally from said insert base for assisting removal of said insert template from said router template body.

17. A router template as recited in claim 14, further comprising thumb niches formed within said insert base closely adjacent to said protruding tabs to facilitate pivoting of said protruded tabs for removal of said template insert from said router template body.

18. A router template as recited in claim 13, wherein said template insert comprises a hinge template for forming a mortise dimensioned for a smaller hinge size.

19. A router template as recited in claim 18, wherein a plurality of said hinge templates are provided for a plurality of different hinge sizes.

20. A router template as recited in claim 13, wherein said template insert comprises a strike plate template for forming a mortise dimensioned for a strike plate positioned along the door jamb.

21. A router template as recited in claim 13, wherein said template insert comprises a latch plate template for forming a mortise dimensioned for a latch plate positioned along the door edge.

22. A router template as recited in claim 20, further comprising an alignment guide attachable to said strike plate template for aligning said strike plate template along the underlying door jamb.

23. A router template as recited in claim 21, further comprising an alignment guide attachable to said latch plate template for aligning said latch plate template along the underlying door edge.

24. A router template as recited in claims 22 or 23, wherein said alignment guide comprises:
   a. a base having a generally flat bottom surface for positioning against the top surface of the base of said strike or latch plate templates;
   b. a support box extending from the bottom surface of said base, and having a length and width smaller then the length and width of the opening of said strike or latch plate templates;
   c. a bore extending through said base and support box, and terminating as a ring wall extending from the bottom surface of said support box; and
   d. securing means for attaching said alignment guide to said strike or latch plate templates, said ring wall being inserted inside a hole drilled in the underlying work piece.

25. A router template as recited in claim 24, wherein said securing means comprises a plurality of protruded tabs extending upwardly from the sides of said support box, having a flanged lip at an intermediate position thereon, and having a lever at the distal end thereof passing through a hole in the base of said alignment guide, for engagement in an interference fit with the perimeter edge of the opening of said strike or latch plate templates, said protruded tabs being pivotable to a slight degree with respect to said alignment guide base by means of said levers.

26. A router template as recited in claims 18, 20, or 21, further comprising bosses extending from the bottom surface of the base elements of the hinge template, strike plate template, or latch plate template, the ends of the bosses engaging the top surface of said router template body wall, said bosses having a predetermined length to produce a hinge mortise, strike plate mortise, or latch plate mortise accommodating butt hinges, strike plates, or latch plates having varying thicknesses.

27. A router template as recited in claim 9, wherein said guide bar further comprises rails extending from the top surface thereof, said rails and said guide bar forming a channel for containing a hinge template, a strike plate template, a latch plate template, or an alignment guide when not in use, said rails having longitudinal grooves formed therein for retaining the edges of said contained tools.

28. A router template as recited in claim 27, wherein said guide bar further comprises a rail extending from the bottom surface of said guide bar being coplanar with one of said top rails to form an elongated rail, said elongated rail forming a T-junction with said guide bar to provide a strengthened connection therewith and a handhold, said elongated rail not interfering with placement of said guide bar along the underlying work surface.

* * * * *